United States Patent [19]

Kubo et al.

[11] Patent Number: 4,986,567
[45] Date of Patent: Jan. 22, 1991

[54] SUSPENSION FOR MOTOR VEHICLES

[75] Inventors: Kanji Kubo; Keiichi Mitobe, both of Tokyo, Japan

[73] Assignee: Honda Giken Kogyo Kabushiki Kaisha, Tokyo, Japan

[21] Appl. No.: 773,439

[22] Filed: Sep. 6, 1985

[30] Foreign Application Priority Data

Sep. 7, 1984 [JP] Japan .................... 59-135918[U]

[51] Int. Cl.$^5$ .................................... B60G 7/00
[52] U.S. Cl. ............................. 280/690; 280/688
[58] Field of Search ............ 280/690, 701, 700, 688

[56] References Cited

U.S. PATENT DOCUMENTS

| 4,157,840 | 6/1979 | Kroniger | 280/688 |
| 4,245,853 | 1/1981 | Inoue | 280/701 |
| 4,471,974 | 9/1984 | Kosak | 280/701 |
| 4,491,341 | 1/1985 | Maebayashi | 280/688 |
| 4,511,160 | 4/1985 | Inoue | 280/690 |
| 4,556,238 | 12/1985 | Matschinsky | 280/701 |

FOREIGN PATENT DOCUMENTS

| 83183 | 7/1983 | European Pat. Off. | 280/701 |
| 51508 | 3/1982 | Japan | 280/701 |
| 76316 | 5/1983 | Japan | 280/701 |

Primary Examiner—Charles A. Marmor
Attorney, Agent, or Firm—Irving M. Weiner; Joseph P. Carrier; Pamela S. Burt

[57] ABSTRACT

A suspension for use in a motor vehicle such as an automobile includes a knuckle arm for supporting a wheel, the knuckle arm having upper and lower ends, an upper arm having an end pivotally coupled to the upper end of the knuckle arm and adpated to extend substantially transversely of the vehicle frame, at least one lower arm having an end pivotally coupled to the lower end of the knuckle arm and adapted to extend substantially transversely of the vehicle frame, a trailing arm having an end pivotally coupled to the knuckle arm and adapted to extend substantially longitudinally of the vehicle frame, and a joint structure pivotally coupling the trailing arm to the knuckle arm for angular movement of the trailing arm about an axis of the vehicle frame.

5 Claims, 1 Drawing Sheet

Prior Art

SUSPENSION FOR MOTOR VEHICLES

BACKGROUND OF THE INVENTION

1. Field of the invention:

The present invention relates to a suspension for use in a motor vehicle, and more particularly to a vehicle suspension having a trailing arm.

2. Description of the Prior Art:

Various rear wheel suspensions for automobiles have been proposed and used to meet different requirements such as better riding comfort, maneuver stability, a reduced weight, a lower manufacturing cost, and a better space saving ability. However, the prior automobile suspensions have proven unsatisfactory.

One known independent rear suspension is disclosed in Japanese Patent Application No. 58-175677 (Japanese Laid-Open Patent Publication No. 60-67203). As shown in FIG. 2 of the accompanying drawings, the disclosed rear suspension is composed of a trailing arm 207, an upper arm 204, a pair of lower arms 213, a knuckle arm 201, and a correcting arm (not shown), the trailing arm 207 comprising a resilient member such as a leaf spring. The rear suspension gives the passengers good riding comfort by allowing the trailing arm 207 to flex so as to be smoothly movable laterally at its rear end. However, this known rear suspension still remains to be improved.

SUMMARY OF THE INVENTION

It is an object of the present invention to provide a suspension for use in a motor vehicle, which can provide better riding comfort by eliminating unwanted forces which would otherwise be produced by transverse movement of a trailing arm for smoother operation of the suspension.

According to the present invention, the above object can be achieved by a suspension for use in a motor vehicle including a knuckle arm for supporting a wheel, the knuckle arm having upper and lower ends, an upper arm having an end pivotally coupled to the upper end of the knuckle, arm and adapted to extend substantially transversely of the vehicle frame, at least one lower arm having an end pivotally coupled to the lower end of the knuckle arm and adapted to extend substantially transversely of the vehicle frame, a trailing arm having an end pivotally coupled to the knuckle arm and adapted to extend substantially longitudinally of the vehicle frame, and a joint structure pivotally coupling the trailing arm to the knuckle arm for angular movement of the trailing arm about an axis of the vehicle frame.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
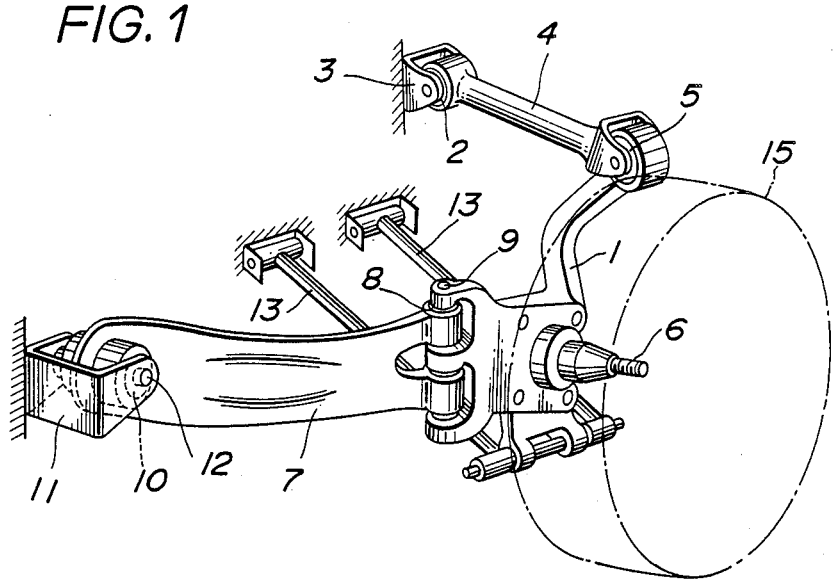
FIG. 1 is a perspective view of a suspension for use in a motor vehicle according to the present invention.
Figure 2:
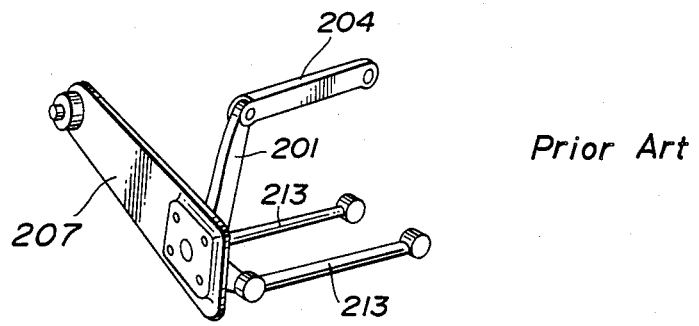
FIG. 2 is a perspective view of a conventional suspension for a motor vehicle.

As shown in FIG. 1, a suspension for use in a motor vehicle such as an automobile according to the present invention includes a knuckle arm 1 having an upper end coupled by a resilient bushing 5 to an end of an upper arm 4 extending transversely of the frame of the motor vehicle. The other end of the upper arm 4 is vertically pivotally coupled to the vehicle frame by a resilient bushing 2 and a bracket 3. A spindle 6 projects laterally from a lower portion of the knuckle arm 1, the spindle 6 supporting a rear wheel 15 indicated by the phantom lines.

A web-shaped trailing arm 7 extends sustantially longitudinally of the vehicle frame and has an end which is transversely pivotally coupled to the knuckle arm 1 by a joint structure composed of resilient bushings 8, 8 and a pin 9 extending therethrough. The trailing arm 7 may comprise a resilient member such as a leaf spring. The other end of the trailing arm 7 is vertically pivotally coupled to the vehicle frame by a bracket 11 through a resilient bushing 10 and a pin 12. A pair of lower arms 13, 13 extends transversely of the vehicle frame between the knuckle arm 1 and the vehicle frame.

The trailing arm 7 has an increased degree of rigidity in the vertical direction. Since the trailing arm 7 is easily swingably movable about the joint structure by which it is coupled to the knuckle arm 1, the trailing arm 7 can be transversely displaced in a sufficient interval without imposing forces tending to bind the joint structure. Therefore, the trailing arm 7 can operate smoothly without producing noise for thereby improving the riding comfort of the vehicle. The resilient bushings 8 of the joint structure between the trailing arm 7 and the knuckle arm 1 are also effective in improving the riding comfort.

With the arrangement of the present invention, as described above, the trailing arm and the knuckle arm are operatively coupled to each other by the joint structure which allows free transverse angular movement about a vertical axis of the vehicle frame. Consequently, the joint structure is free from forces tending to bind the same to permit the suspension to operate smoothly for improved riding comfort of the vehicle.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

We claim:

1. A suspension for use in a motor vehicle having a vehicle frame, comprising:

a knuckle arm for supporting a wheel, said knuckle arm having upper and lower ends;

an upper arm having an end pivotally coupled to the upper end of said knuckle arm and adapted to extend substantially transversely of the vehicle frame;

at least one lower arm having an end pivotally coupled to the lower end of said knuckle arm and adapted to extend substantially transversely of the vehicle frame;

a trailing arm extending substantially longitudinally of the vehicle frame, said trailing arm having one end pivotally connected to the vehicle frame through a resilient bushing and the other end pivotally connected to said knuckle arm through a joint structure; and said joint structure being constructed so that said trailing arm is swingable relative to said knuckle arm about a vertical axis of the vehicle frame.

2. A suspension according to claim 1, wherein said joint structure comprises a plurality of resilient bushings and a pin extending therethrough.

3. A suspension according to claim 1, wherein said trailing arm comprises a resilient member.

4. A suspension according to claim 3, wherein said resilient member comprises a leaf spring.

5. A suspension according to claim 1, wherein two lower arms are pivotally coupled to said knuckle arm.

* * * * *

UNITED STATES PATENT AND TRADEMARK OFFICE
CERTIFICATE OF CORRECTION

PATENT NO. : 4,986,567
DATED : January 22, 1991
INVENTOR(S) : Kubo et al.

It is certified that error appears in the above-identified patent and that said Letters Patent is hereby corrected as shown below:

In the Abstract, line 5, correct the spelling of "adapted".

Column 1, line 41, delete the comma.

Signed and Sealed this

Second Day of June, 1992

Attest:

DOUGLAS B. COMER

Attesting Officer

Acting Commissioner of Patents and Trademarks